US008886826B2

(12) United States Patent
McCanne et al.

(10) Patent No.: US 8,886,826 B2
(45) Date of Patent: Nov. 11, 2014

(54) SYSTEM FOR MULTIPOINT INFRASTRUCTURE TRANSPORT IN A COMPUTER NETWORK

(75) Inventors: Steven McCanne, Berkeley, CA (US); Andrew Swan, Berkeley, CA (US)

(73) Assignee: Google Inc., Mountain View, CA (US)

( * ) Notice: Subject to any disclaimer, the term of this patent is extended or adjusted under 35 U.S.C. 154(b) by 2636 days.

(21) Appl. No.: 10/618,369

(22) Filed: Jul. 10, 2003

(65) Prior Publication Data

US 2004/0139150 A1 Jul. 15, 2004

Related U.S. Application Data

(62) Division of application No. 09/412,815, filed on Oct. 5, 1999, now Pat. No. 6,850,987.

(60) Provisional application No. 60/137,153, filed on Jun. 1, 1999.

(51) Int. Cl.
| | | |
|---|---|---|
| G06F 15/16 | (2006.01) | |
| H04L 12/851 | (2013.01) | |
| H04L 12/54 | (2013.01) | |
| H04L 12/927 | (2013.01) | |
| H04L 12/911 | (2013.01) | |
| H04L 12/18 | (2006.01) | |
| H04L 12/801 | (2013.01) | |
| H04L 29/06 | (2006.01) | |

(52) U.S. Cl.
CPC ............ *H04L 12/5695* (2013.01); *H04L 47/24* (2013.01); *H04L 69/24* (2013.01); *H04L 47/806* (2013.01); *H04L 47/783* (2013.01); *H04L 29/06* (2013.01); *H04L 12/185* (2013.01); *H04L 47/15* (2013.01)

USPC .......................................... 709/238

(58) Field of Classification Search
USPC .......................... 709/238; 370/210
See application file for complete search history.

(56) References Cited

U.S. PATENT DOCUMENTS

| | | | | |
|---|---|---|---|---|
| 4,491,909 A | * | 1/1985 | Shimizu ...................... 711/147 |
| 4,807,224 A | | 2/1989 | Naron et al. | |
| 5,331,637 A | * | 7/1994 | Francis et al. ................ 370/408 |
| 5,517,494 A | * | 5/1996 | Green .......................... 370/408 |

(Continued)

OTHER PUBLICATIONS

Deering, S. and Cheriton, D., "Multicast Routing in Datagram Internetworks and Extended LANs," *ACM Transactions on Computer Systems*, vol. 8, No. 2, May 1990, pp. 85-110.

(Continued)

*Primary Examiner* — Scott Christensen
(74) *Attorney, Agent, or Firm* — Fish & Richardson P.C.

(57) ABSTRACT

A method and apparatus for implementing a Multipoint Infrastructure Transport (MINT) protocol in a data network. The present invention includes a method for distributing data in a data network. The data network connects a plurality of nodes and at least a portion of the plurality of the nodes form a multicast group. One of the nodes in the multicast group is designated as a rendezvous node. The method includes a step of maintaining a data store containing a group state at each of the nodes in the multicast group. State updates, received at the rendezvous node are used to update the group state in the data store at the rendezvous node. The state updates are propagated, using a reliable protocol, from the rendezvous node to the other nodes in the multicast group. Finally, the group states in the data stores at the other nodes in the multicast group are updated.

21 Claims, 11 Drawing Sheets

(56) References Cited

U.S. PATENT DOCUMENTS

| | | | |
|---|---|---|---|
| 5,530,963 A * | 6/1996 | Moore et al. | 709/243 |
| 5,572,678 A * | 11/1996 | Homma et al. | 709/227 |
| 5,606,705 A * | 2/1997 | Randall et al. | 709/203 |
| 5,634,011 A | 5/1997 | Auerbach et al. | |
| 5,640,553 A * | 6/1997 | Schultz | 707/5 |
| 5,721,951 A * | 2/1998 | DorEl | 710/10 |
| 5,751,338 A | 5/1998 | Ludwig, Jr. | |
| 5,793,962 A * | 8/1998 | Badovinatz et al. | 709/201 |
| 5,831,975 A * | 11/1998 | Chen et al. | 370/256 |
| 5,898,686 A * | 4/1999 | Virgile | 370/381 |
| 5,903,559 A | 5/1999 | Acharya et al. | |
| 5,946,316 A | 8/1999 | Chen et al. | |
| 5,956,716 A | 9/1999 | Kenner et al. | |
| 6,003,030 A | 12/1999 | Kenner et al. | |
| 6,052,718 A | 4/2000 | Gifford | |
| 6,112,239 A | 8/2000 | Kenner et al. | |
| 6,138,144 A * | 10/2000 | DeSimone et al. | 709/204 |
| 6,148,005 A | 11/2000 | Paul et al. | |
| 6,219,706 B1 * | 4/2001 | Fan et al. | 709/225 |
| 6,243,758 B1 * | 6/2001 | Okanoue | 709/238 |
| 6,286,052 B1 | 9/2001 | McCloghrie et al. | |
| 6,321,270 B1 * | 11/2001 | Crawley | 709/238 |
| 6,331,983 B1 * | 12/2001 | Haggerty et al. | 370/400 |
| 6,411,616 B1 * | 6/2002 | Donahue et al. | 370/352 |
| 6,631,420 B1 * | 10/2003 | Li et al. | 709/242 |
| 6,684,331 B1 * | 1/2004 | Srivastava | 713/163 |
| 6,711,163 B1 * | 3/2004 | Reid et al. | 370/390 |
| 6,735,633 B1 * | 5/2004 | Welch et al. | 709/233 |
| 6,785,274 B2 * | 8/2004 | Mahajan et al. | 370/390 |
| 6,795,433 B1 * | 9/2004 | Li | 370/389 |
| 6,850,987 B1 * | 2/2005 | McCanne et al. | 709/238 |
| 6,873,618 B1 * | 3/2005 | Weaver | 370/390 |
| 6,983,317 B1 * | 1/2006 | Bishop et al. | 709/223 |
| 7,092,399 B1 * | 8/2006 | Cheriton | 370/401 |
| 7,111,035 B2 * | 9/2006 | McClellan et al. | 709/201 |
| 7,162,737 B2 * | 1/2007 | Syvanne et al. | 726/12 |
| 2002/0107966 A1 * | 8/2002 | Baudot et al. | 709/227 |
| 2003/0084371 A1 * | 5/2003 | Mongazon-Cazavet et al. | 714/13 |
| 2003/0165140 A1 * | 9/2003 | Tang et al. | 370/393 |
| 2003/0195962 A1 * | 10/2003 | Kikuchi et al. | 709/226 |
| 2003/0217096 A1 * | 11/2003 | McKelvie et al. | 709/202 |
| 2004/0073646 A1 * | 4/2004 | Cho et al. | 709/223 |
| 2004/0078619 A1 * | 4/2004 | Vasavada | 714/4 |
| 2004/0199808 A1 * | 10/2004 | Freimuth et al. | 714/4 |
| 2005/0102427 A1 * | 5/2005 | Yokota et al. | 709/245 |

OTHER PUBLICATIONS

Maffeis, S., Bischofberger, W.R., and Mätzel, K. -U., "GTS: A Generic Multicast Transport Service," *UBILAB Technical Report*, 94.6.1, 1994, pp. 1-7.

Bormann, C., Ott, J., Gehrcke, H.C., Kerschat, T., and Seifert, N., "Mtp-2: Towards achieving the S.E.R.O. Properties for Multicast Transport," International Conference on Computer Communications Networks, (San Francisco, California), Sep. 1994.

Parsa, M., and Garcia-Luna-Aceves, J., "Scalable Internet Multicast Routing," Proceedings of ICCCN 95, (Las Vegas, Nevada), Sep. 1995.

Thyagarajan, A.S., and Deering, S.E., Hierarchical Distance-Vector Multicast Routing for the MBone, Sigcomm '95, (Cambridge, Massachusetts), Aug. 1995.

Yavatkar, R., Griffioen, J. and Sudan, M., "A Reliable Dissemination Protocol for Interactive Collaborative Applications," ACM Multimedia 1995 (San Francisco, California) Nov. 1995.

Amir, E., McCanne, S., and Zhang, H., "An Application Level Video Gateway." ACM Multimedia 1995 (San Francisco, California) Nov. 1995.

Lin, J.C., and Paul, S., "Rmtp: A Reliable Multicast Transport Protocol," IEEE INFOCOM '96, pp. 1414-1424.

Deering, S., Estrin, D., Farinacci, D., Jacobson, V., Liu, C., and Wei, L., "The Pim Architecture for Wide-Area Multicast Routing," *IEEE/ACM Transactions on Networking*, vol. 4, No. 2, Apr. 1996, pp. 153-162.

Atwood, J.W., Catrina, O., Fenton, J., and Strayer, W. Timothy, "Reliable Multicasting in the Xpress Transport Protocol," Proceedings of the 21$^{st}$ Local Computer Networks Conference (Minneapolis, Minnesota) Oct. 13-16, 1996.

Perkins, C., and Crowcroft, J., Real-Time Audio and Video Transmission of IEEE GLOBECOM '96 Over the Internet, *IEEE Communications Magazine*, vol. 35, Apr. 1997, pp. 30-33.

Sharma, P., Estrin, D., Floyd, S. and Jacobson, V., "Scalable Timers for Soft State Protocols," Proceedings IEEE Infocom '97 (Kobe, Japan) Apr. 1997.

Mittra, S., "Iolus: A Framework for Scalable Secure Multicasting," *ACM Computer Communication Review*, vol. 27, Oct. 1997, pp. 277-288.

Hodel, H., "Policy Tree Multicast Routing: An Extension to Sparse Mode Source Tree Delivery," ACM Computer Communication Review, vol. 28, No. 2 Apr. 1998, pp. 78-97.

Kumar, S., Radoslavov, P., Thaler, D., Alaettinoglu, C., Estrin, D., and Handley, M., "The MASC/BGMPL Architecture for Inter-Domain Multicast Routing," SIGCOMM '98 (Vancouver, Canada) Sep. 1998.

Decasper, D., Dittia, Z., Parulkar, G., Plattner, B. "Router Plugins: A Software Architecture for Next Generation Routers," ACM SIGCOMM '98 (Vancouver, Canada) Sep. 1998.

Handley, M., Crowcroft, J., Borman, C., Ott, J., "Very Large Conferences on the Internet: The Internet Multimedia Conferencing Architecture," Computer Networks, vol. 31, No. 3, 1999 pp. 191-204.

Holbrook, H. and Cheriton, D.R., "IP Multicast Channels: EXPRESS Support for Large-Scale Single-Source Applications," Computer Communication Review, vol. 29, No. 4, Oct. 1999.

Farinacci, D., Lin, A., Speakman, T., and Tweedly, A., "Pretty Good Multicast (PGM) Transport Protocol Specification," Internet Draft, Internet Engineering Task Force, Jan. 1998.

Farinacci, D., Wei, L., and Meylor, J., "Use of Anycast Clusters for Inter-Domain Multicast Routing," Internet Draft, Internet Engineering Task Force, Mar. 1998.

Robertson, K., Miller, K., White, M., and Tweedly, A., "StarBurst Multicast File Transfer Protocol (MFTP) Specification," Internet Draft, Internet Engineering Task Force, Apr. 1998.

Bannerjea, A. Faloutsos, M., and Pankaj, R., "Designing QoSMIC: A Quality of Service Sensitive Multicast Internet Protocol," Internet Draft, Internet Engineering Task Force, May 1998.

Thaler, D., Estrin, D., Meyer, D., "Border Gateway Multicast Protocol (BGMP): Protocol Specification," Internet Draft, Nov. 1998.

Casey, L., Cunningham, I., and Eros, R., "IP VPN Realization Using MPLS Tunnels," Internet Engineering Task Force, Nov. 1998.

Finlayson, R., "A More Loss-Tolerant RTP Payload Format for MP3 Audio," Internet Draft, Jan. 1999.

Finlayson, R. "IP Multicast and Firewalls," Internet Draft, May 1999.

Blazevic, L. and Le Boudec, J., "Distributed Core Multicast (DCM): A Routing Protocol for Many Small Groups with Application to Mobile IP Telephony," Internet Engineering Task Force, Jun. 1999.

Hampton, D., Oran, D., Salama, H., and Shad, D., The IP Telephony Border Gateway Protocol (TBGP), Internet Engineering Task Force, Jun. 1999.

Finlayson, R. "The UDP Multicast Tunneling Protocol," Internet Draft, Jul. 1999.

Malis,Aa., Heinanen, J., Armitage, G., Gleeson, B., "A Framework for IP Based Virtual Private Networks Internet Draft," Aug. 1999.

Waitzman, D., Partridge, C., Deering, S. E., "Distance Vector Multicast Routing Protocol," Request for Comments RFC 1075, Nov. 1988.

Hanks, S., Li, T., Farinacci, D., and Trains, P., "Generic Routing Encapsulation," Request for Comments RFC 1701, Oct. 1994.

Farinacci, D., Hanks, S., Li, T., and Traina, P., "Generic Routing Encapsulation Over IPv4 Networks," Request for Comments RFC 1702, Nov. 1994.

Schulzrinne, H., Casner, S., Frederick, R., Jacobson, V., "RTP" A Transport Protocol for Real-Time Applications, Request for Comments RFC 1889, Jan. 1996.

Fenner, W., "Internet Group Management Protocol," Version 2, RFC 2236, Nov. 1997.-

(56) References Cited

OTHER PUBLICATIONS

Ballardie, A., "Core Based Trees (CBT) Multicast Routing Architecture," Request for Comments, RFC 2201, Sep. 1997.

Estrin, D., Farinacci, D., Helmy, A., Thaler, D., Deering, S., Handley, M., Jacobson, V., Liu, C., Sharma, P, and Wei, L., "Protocol Independent Multicast-Sparse Mode (PIM-SM)," Request for Comments, RFC 2362, Jun. 1998.

Arango, M., Dugan, A., Elliott, I, Huitema, C., and Pickett, S., "Media Gateway Control Protocol (MGCP) Version 1.0," RFC 2705, Oct. 1999.

Japanese Office Action received in related case 2001-500493 dated Sep. 2, 2009 (2 pages).

Patent Abstracts of Japan 09-200269 published Jul. 31, 2007 (1 page).

Current Claims of 2001-500493, Nov. 2009 (6 pages).

\* cited by examiner

| GROUP 401 | ORIGIN (OWNER) 402 | NAME 404 | VALUE 406 | PRIORITY 408 |
|---|---|---|---|---|
| G | 10.1.1.8 | MEDIATYPE | NETSHOW | 1 |
| | | AUTHOR | THOMPSON | 3 |
| | | TITLE | FEAR AND LOATHING | 2 |
| | | RATING | G | 3 |
| | 10.11.77.132 | MEDIATYPE | MEDIATYPE | 1 |
| | | AUTHOR | CBS SPORTS | 3 |
| | | TITLE | PENGUINS V DUCKS | 2 |
| | | DURATION | 2:30:00 | 5 |

*FIG. 4.*

SYSTEM FOR MULTIPOINT INFRASTRUCTURE TRANSPORT IN A COMPUTER NETWORK

CROSS REFERENCES TO RELATED APPLICATIONS

This application is a divisional application of U.S. Patent Application Ser. No. 09/412,815 entitled, "SYSTEM FOR MULTIPOINT INFRASTRUCTURE TRANSPORT IN A COMPUTER NETWORK," filed on Oct. 5, 1999 (hereinafter "McCanne '815). This application claims priority from U.S. Provisional Patent Application 60/137,153 filed on Jun. 1, 1999. This application is related to U.S. Patent Application Ser. No. 09/323,869 entitled "PERFORMING MULTICAST COMMUNICATION IN COMPUTER NETWORKS BY USING OVERLAY ROUTING" filed Jun. 1, 1999 (hereinafter "McCanne '869") and to U.S. Patent Application Ser. No. 09/384,865 entitled "SYSTEM FOR BANDWIDTH ALLOCATION IN A COMPUTER NETWORK" filed Aug. 27, 1999 (hereinafter "McCanne '865"). Each of these applications is hereby incorporated by reference as if set forth in full in this document.

FIELD OF THE INVENTION

This invention relates generally to the field of computer networks, and more particularly, to a multipoint transfer protocol for use in a computer network.

BACKGROUND OF THE INVENTION

As the Internet gains in popularity it is desirable to provide for "multicasting" of information, such as multimedia information, over the Internet. Multicasting is the process of transmitting information from a host on a data network to a select plurality of hosts on the data network. The select plurality is often referred to a "multicast group."

While unicast delivery of data has enjoyed tremendous success as the fundamental building block of the Internet, multicasting has proven far more complex and many technical barriers remain that prevent multicasting from being deployed across a wide area. For example, interdomain multicast routing has yet to be successfully realized and there are many reasons to believe that multicast, in its present form, may never be universally deployed throughout the Internet. On the other hand, multicasting, when restricted to a singly administered network domain, has been much easier to configure and manage, and for some applications, may provide acceptable performance.

One problem associated with current multicasting techniques, even in singly administered network domains, is that as group members come and go there is no delivery mechanism which assures that information will be reliably delivered to all current group members. In addition, there is generally no delivery mechanism that assures efficient routing of the information throughout the multicast group. Because of the lack of such a delivery mechanism, the use of multicasting has been largely restricted to use in applications where reliable delivery and efficient routing is not required.

SUMMARY OF THE INVENTION

The present invention provides a method and apparatus for implementing a Multipoint Infrastructure Transport (MINT) protocol in a data network. The MINT protocol provides a reliable information delivery mechanism between a single node in the data network and all other infrastructure as well as end-host nodes in the data network that are subscribed to a particular group. The present invention is suitable for use with groups formed using IP Multicast routing protocols like sparse mode PIM or core based trees (CBT), or in other multicast protocols wherein the multicast group has an associated a rendezvous point or node. An example of such a protocol is described in McCanne '869, wherein a description of an Overlay Multicast Network (OMN) is disclosed.

One embodiment of the present invention provides a method for distributing data in a data network. The data network connects a plurality of nodes and at least a portion of the plurality of the nodes form a multicast group. One of the nodes in the multicast group is designated as a rendezvous node. The method includes a step of maintaining a data store containing a group state at each of the nodes in the multicast group. State updates, received at the rendezvous node are used to update the group state in the data store at the rendezvous node. The state updates are propagated, using a reliable protocol, from the rendezvous node to the other nodes in the multicast group. Finally, the group state in the data stores at the other nodes in the multicast group are updated.

In another embodiment of the present invention, a processing agent for processing data at a node in a data network is provided. The data network connects a plurality of nodes and at least a portion of the plurality of the nodes form a multicast group. One of the nodes in the multicast group is designated as a rendezvous node. The processing agent comprises a state memory and a protocol processor. The protocol processor has logic to couple to a selected node in the data network and has logic to transmit and receive data with other processing agents in the data network over a data channel using a reliable protocol. The protocol processor also couples to the state memory and has logic to store and retrieve the data to and from the state memory, respectively.

BRIEF DESCRIPTION OF THE DRAWINGS

FIG. 4 shows exemplary MINT information;

DESCRIPTION OF THE SPECIFIC EMBODIMENTS

In one embodiment, the present invention provides a method and apparatus for implementing a MINT protocol in a data network to provide a reliable information delivery mechanism between a sender node in the data network and members of a multicast group, infrastructure and/or end-hosts in the data network.

Using MINT, senders associate named values to a multicast group which are published into and across the data network, thereby allowing other group members as well as network entities to query this "database" of distributed state. Each tuple in the database, called a "mint", is identified by its owner (the multicast sender), name and multicast group. The mints are disseminated reliably to all parts of the network with active group participants. Preferably, mints flow only to routers that fall along a path from the source to the set of active receivers for that group. This results in efficient routing of the MINT information which is an advantage over prior systems, that operate by flooding the entire network with information without regard to efficient routing and distribution. An end host may query the multicast subsystem to discover and/or enumerate all known mints published by each owner. In turn, the mint values can be queried by reference to the name/owner, and the agent performing the query can be asynchronously notified when the owner modifies the values.

In one embodiment, specific mints are reserved for system specific functions that, for instance, map a group to an application type or describe the attributes of a group so that the group can be mapped into locally defined traffic classes in different parts of the network. For example, if a transmitted data stream requires application-level processing and/or traffic management, a special "setup mint" provides the requisite information and precedes the transmission of data.

In another embodiment, an information source can use the MINT protocol to publish mints that annotate data streams injected into the group. Specialized packet forwarding engines, located at each node on the multicast tree for the group in question, process the received data streams based on the stream annotations. For example, the packet forwarding engines can allocate network bandwidth to the data streams based on the stream annotations.

Figure 1A:
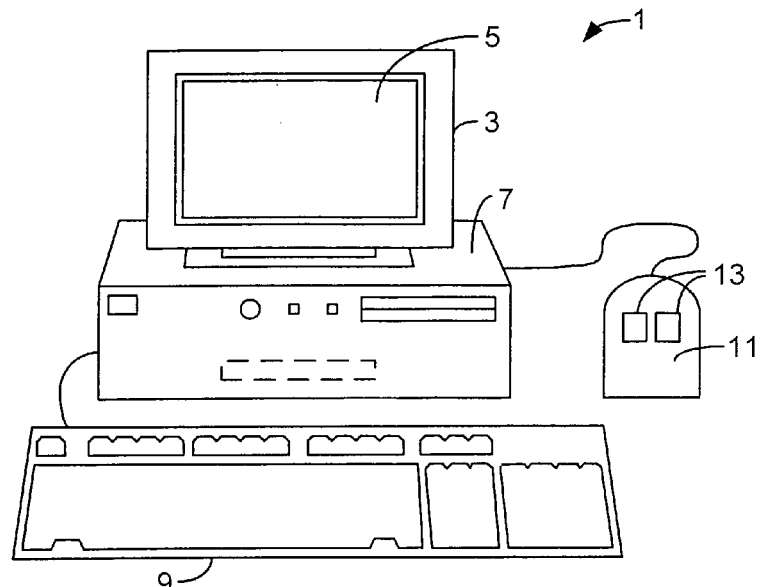
FIG. 1A shows a computer suitable for use with the present invention.

FIG. 1A is an illustration of computer system 1 suitable for use with the present invention. The computer system 1 includes display 3 having display screen 5. Cabinet 7 houses standard computer components (not shown) such as a disk drive, CDROM drive, display adapter, network card, random access memory (RAM), central processing unit (CPU), and other components, subsystems and devices. User input devices such as mouse 11 having buttons 13, and keyboard 9 are shown. Other user input devices such as a trackball, touch-screen, digitizing tablet, etc. can be used. In general, the computer system is illustrative of but one type of computer system, such as a desktop computer, suitable for use with the present invention. Computers can be configured with many different hardware components and can be made in many dimensions and styles (e.g., laptop, palmtop, pentop, server, workstation, mainframe). Any hardware platform suitable for performing the processing described herein is suitable for use with the present invention.

Figure 1B:
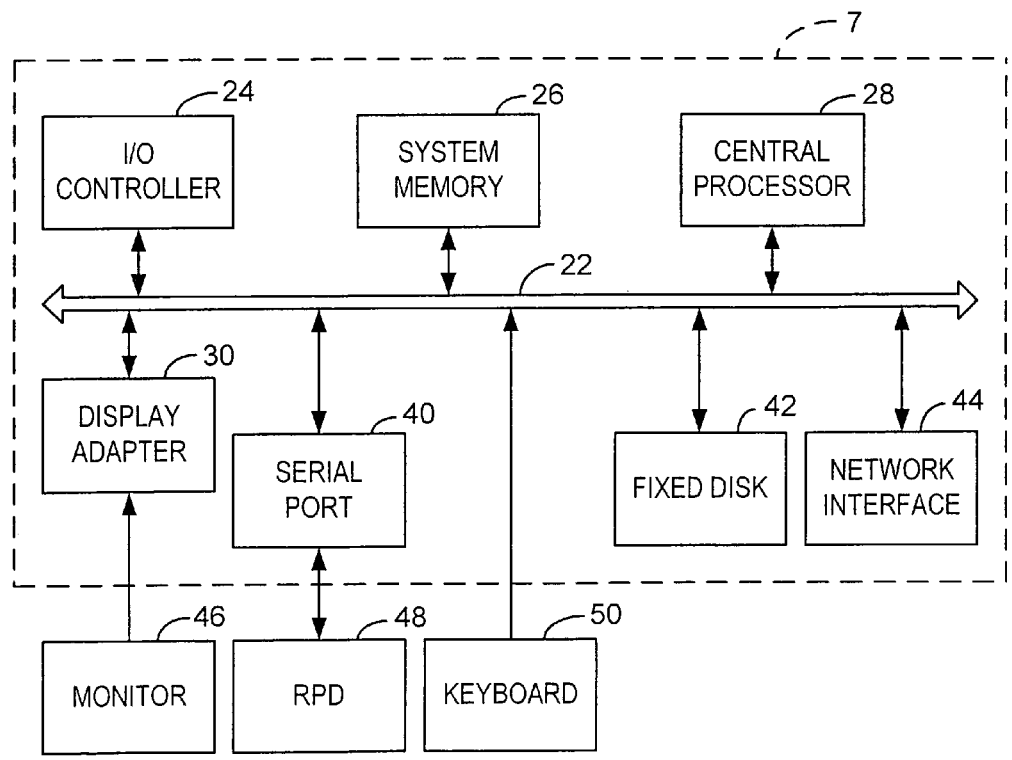
FIG. 1B shows subsystems in the computer of FIG. 1A.

FIG. 1B illustrates subsystems that might typically be found in a computer such as the cabinet 7 of computer 1. In FIG. 1B, subsystems are directly interfaced to internal bus 22. Subsystems include input/output (I/O) controller 24, System Random Access Memory (RAM) 26, Central Processing Unit (CPU) 28, Display Adapter 30, Serial Port 40, Fixed Disk 42 and Network Interface Adapter 44. The use of bus 22 allows each of the subsystems to transfer data among the subsystems and, most importantly, with the CPU. External devices can communicate with the CPU or other subsystems via bus 22 by interfacing with a subsystem on the bus. Monitor 46 connects to the bus through Display Adapter 30. A relative pointing device (RPD) 48, such as a mouse connects through Serial Port 40. Some devices such as Keyboard 50 can communicate with the CPU by direct means without using the main data bus as, for example, via an interrupt controller and associated registers (not shown).

As with the external physical configuration shown in FIG. 1A, many subsystem configurations are possible. FIG. 1B is illustrative of but one suitable configuration. Subsystems, components or devices other than those shown in FIG. 1B can be added. A suitable computer system can be achieved without using all of the subsystems shown in FIG. 1B. Other subsystems such as a CDROM drive, graphics accelerator, etc. can be included in the configuration without affecting the performance of the system of the present invention.

Figure 2:
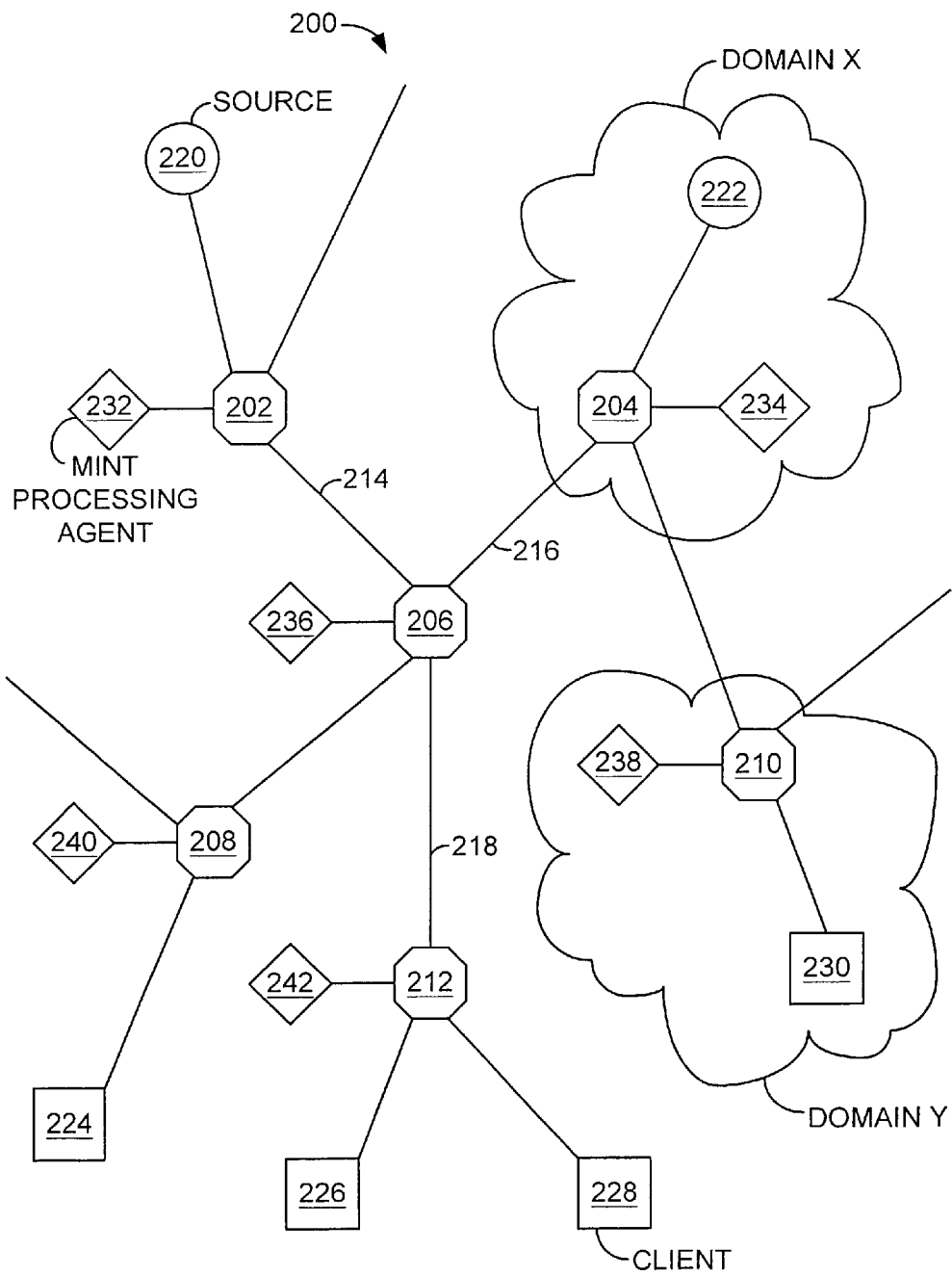
FIG. 2 shows a data network constructed in accordance with the present invention.

FIG. 2 shows a portion of a data network 200 constructed in accordance with the present invention. The network 200 comprises routing nodes (or native routers) 202, 204, 206, 208, 210 and 212. The nodes are interconnected by bi-directional links, such as those shown at 214, 216 and 218. Included in the network 200 are information sources 220 and 222. Also shown in the network 200 are clients 224, 226, 228 and 230, which are coupled to routing nodes via additional bi-directional links. The network 200 illustrates that routing nodes 204 and 210 may, in fact, be part of other network domains, such as domain X and domain Y, respectively. Thus, the network 200 is representative of but one embodiment of the present invention. It will be apparent to those with skill in the art that other embodiments of the present invention may be used in other types of network architectures or topologies.

Coupled to each of the nodes of the network 200 are MINT processing agents 232, 234, 236, 238, 240 and 242. The MINT processing agents are shown as being external to the routing nodes, however, the MINT processing agents can be incorporated within each of the routing nodes. The MINT processing agents receive and transmit information via their associated node to implement the MINT protocol. The network 200 is capable of forming multicast groups as in, for example, IP Multicast routing protocols like sparse mode PIM or core based trees, wherein the multicast group has an associated rendezvous point or node.

Figure 3:
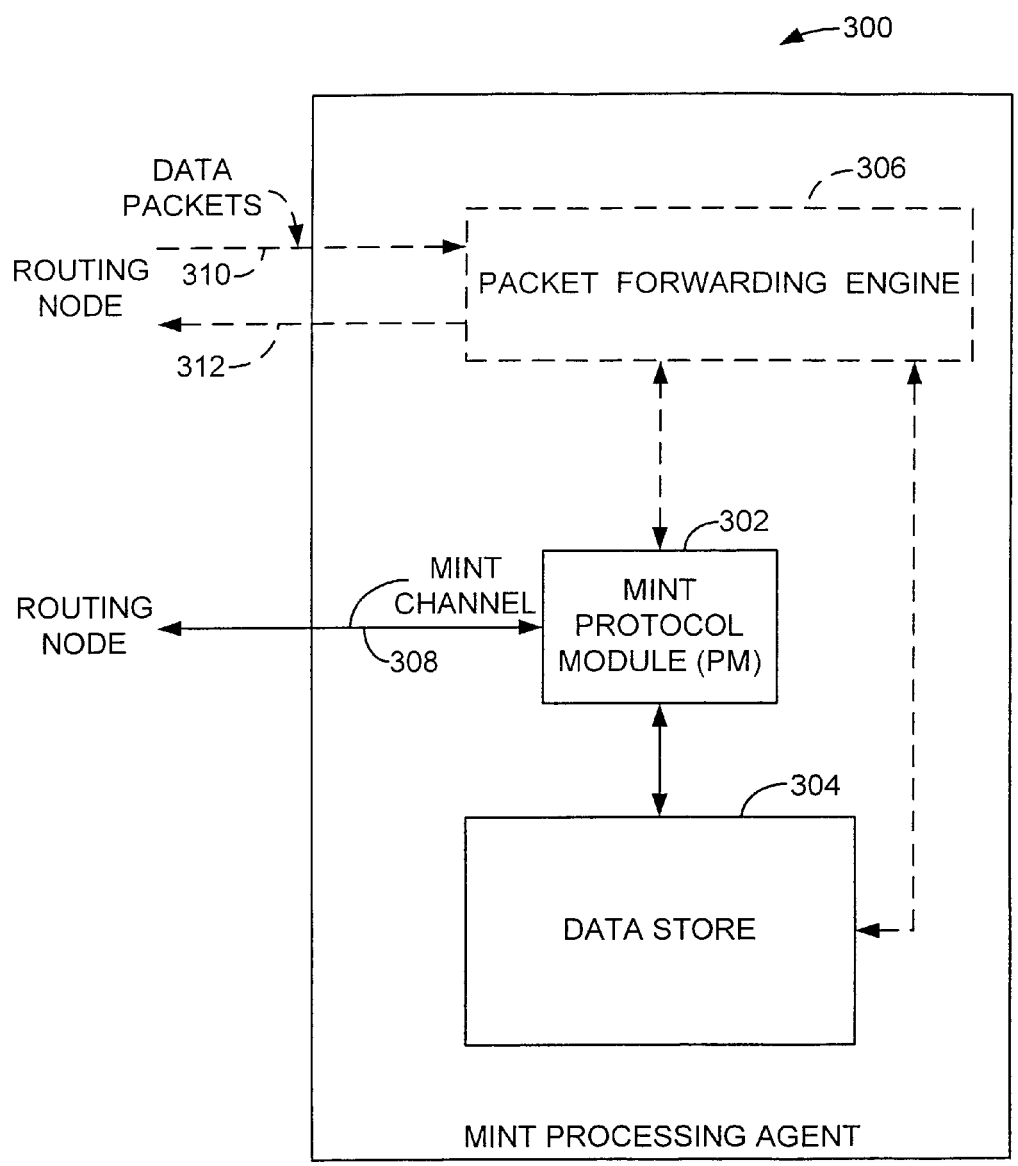
FIG. 3 shows a block diagram of a MINT processing agent 300 constructed in accordance with the present, invention.

FIG. 3 shows an exemplary embodiment of a MINT processing agent 300 constructed in accordance with the present invention. The MINT processing agent 300 is representative of the MINT processing agents shown in FIG. 2, such as MINT processing agent 232. The MINT processing agent 300 can be used in the data network 200 to implement the MINT protocol. The MINT processing agent comprises a MINT Protocol Module (PM) 302, a data store 304 and an optional packet forwarding engine 306.

The MINT-PM 302 couples to a routing node in the data network via link 308. The MINT-PM uses the link 308 to communicate with the routing node and to form a MINT channel that allows the MINT processing agents in the data network to communicate with one another. For example, the MINT channel is used to transmit and receive information between the MINT processing agents and/or between the MINT processing agents and clients, information sources and any other end-hosts in the data network. The data store 304 couples to the MINT-PM and stores the mint information which forms a database of distributed state.

The optional packet forwarding engine 306 can be used when the MINT processing agents are used to regulate traffic streams based on mint information as described in McCanne '865. The packet forwarding engine 306 receives data packets 310 transmitted on the network 200 and processes the received data packets to form an output data stream 312 for transmission on the network. The packet forwarding engine 302 couples to the MINT-PM 302 and the data store 304, to exchange information that is used to determine how the packet forwarding engine 306 processes the received data packets. For example, mint information retrieved from the data store 304 is used by the packet forwarding 306 engine to determine bandwidth allocations on the data network for the received data packets 310. In another example, mint information retrieved from the data store 304 is used by the packet forwarding 306 engine to schedule packets in the output data stream 312 based on priority information contained in the mint information.

In another embodiment of the MINT processing agent 300, the packet forwarding engine 306 is omitted from the MINT processing agent and is assumed to exist within the incident native router. In such an embodiment, the MINT processing agent is used to process and transmit mints in the data network but performs no processing on data packets transmitted in the network. Thus, the MINT processing agent would be limited to the tasks of processing mints and providing the reliable delivery of mints in the data network.

The MINT Protocol

The MINT protocol provides a group-oriented, reliable information delivery mechanism to the subset of nodes in a data network that span the multicast routing tree supporting the corresponding group. In addition, end-host sources may publish data into the network by directing MINT instructions to the rendezvous point for the group in question. The MINT protocol provides a mechanism whereby a set of published values are maintained at all MINT processing agents associated with active nodes in the spanning tree as members come and go. Additional features of the MINT protocol provide for queries by arbitrary network clients or management agents to obtain the most recent set of published values.

A MINT channel is associated with each active multicast group. The MINT channel might be a reliable control connection using TCP that adheres to a MINT access protocol which comprises a number of MINT instructions. Applications publish named data tuples called "mints" into the MINT channel by directing MINT instructions to the rendezvous point; in turn, the MINT-PM at the rendezvous point ensures that each such mint is propagated to all MINT processing agents associated with active routing nodes that are incident to the distribution tree for that group. This allows edge applications to publish state into the network and communicate with application-level processing agents (i.e., plugins) that may exist in the network or may be provided as part of the MINT processing agents. For example, the packet forwarding engines may run application-level processing agents that can communicate with edge applications via the MINT channel, to allocate network bandwidth to the edge applications. The MINT protocol also provides a well-defined communication abstraction for disseminating mints along the paths of the spanning tree in a dynamic fashion as sub-trees come and go. Whenever a router, or node, grafts on a branch to a given group's spanning tree, all the mints for that group are flooded, or propagated, along the newly created branch. As a result, state is reliably propagated to all MINT processing agents along the newly grafted branch.

The Data Model

The data model assumed by the MINT protocol is a persistent data store of named tuples or mints. An origin node (or owner) may publish mints into the network or may relinquish its attachment to the persistent data store using the MINT access instructions. If a node fails or becomes otherwise disconnected from the network, all of its published bindings are expunged from its associated data store when the corresponding leg of the multicast routing tree (for the group in question) is torn down.

Because mints are persistent, the MINT processing agent may run out of resources to maintain all the mints published into the network. In this case, the mint publishing process fails. To notify the end clients of this failure, a special, reserved error mint is attached to the group and has priority over all existing mints.

Static priorities may be assigned to mints. This controls the relative ordering of mints as they are propagated between MINT processing agents as legs of the distribution tree come and go. Each mint is named with a structured hierarchical name, thereby providing a rich mechanism for reviewing a class of mints by prefix, regular expression or other reviewing technique. MINT data names are represented as textual strings while MINT values are arbitrary binary data.

FIG. 4 shows exemplary MINT information 400 that may occur at the data store 304 of the MINT processing agent 360. The MINT information 400 comprises tuples of mint parameters representing any type of information. For example, the mint parameters may be descriptive of information transmitted in the data network. Although a specific embodiment of the MINT information 400 is shown in FIG. 4, it will be apparent to one with skill in the art that other embodiments of the MINT information representative of other types of data are possible without deviating from the scope of the present invention.

The MINT information 400 is comprised of mints having a group 401, origin 402, name 404, value 406 and priority 408. Since a node in the data network may be associated with one or more multicast groups, the MINT information may contain mint parameters associated with one or more multicast groups. As shown in FIG. 4, an origin may be associated with several named values. In the specific embodiment of the MINT information 400, the name and value pairs describe video data streams. It will be apparent to those with skill in the art that the name and value pairs may represent any type of information.

The Namespace

The names that index the MINT data store naturally form a namespace. Associated with each group is an autonomous namespace, i.e., each group's mints are completely independent of all other groups. To support rich and efficient queries over these namespaces, names are represented in a structured yet simple form. Specifically, the names form a hierarchical namespace, wherein the hierarchy demarcations are denoted by a "/" separator, just as the Unix file system arranges directory names into a hierarchy and uses the "/" separator to indicate the relative elements of the path through the tree-based hierarchy.

The hierarchical namespace representation allows matching queries to be run against the existing name space. For example, to build an advertisement-insertion service, a broadcast system might publish advertisement information as a series of mints under the prefix "/ad/info". Thus, a client might want to query the database to see what names exists under this prefix with a "globbing" match, e.g., "/ad/info/*". Likewise, a network agent might want to be notified whenever this information changes, so that an event callback can occur when any mints that match "/ad/info/*" are created, deleted, or modified.

The Protocol Module

Each MINT processing agent in the network includes a MINT protocol module (MINT-PM) that maintains the data store, indexed by origin, group and name of all published mints known to that agent. The publisher of a mint is called its origin or owner. While an origin may be located anywhere in the data network, it must publish mints for a particular group via that group's rendezvous point.

In one embodiment of the invention, each mint is published indefinitely and there is no refresh process. This is possible because the MINT protocol (in association with the underlying routing protocol) allows the group state to be maintained consistently across the group spanning-tree. For example, when a failure occurs in some routing protocols, the routing system responds by tearing down, and then re-establishing the group as necessary; consequently, any mints attached to the group in question will be propagated by the MINT protocol as the group is reconstructed. Thus, the group state can be managed consistently and there is no need for a refresh/timeout process.

The amount of mint state that any single node can inject into the network is limited by a configurable parameter. The data stored for each tuple associated with any given group includes the following elements:

| | |
|---|---|
| group | The name of the multicast group |
| origin | The primary IP address of the node that published this entry. |
| name $\epsilon$ | The string-based name of this entry. Each tuple has a unique name relative to its origin. |
| value | The value of the named data. This may be arbitrary binary data whose semantics are outside the scope of this protocol specification. |
| priority (pri) | A small integer that represents the delivery priority of this item compared to other published values (higher priority values tend to be sent before lower priority values). |

There is no need for a sequence number or timestamp because the data store at each node will provably converge to the data store maintained at the rendezvous point for the group.

There are three types of protocol messages:

publish messages cause a MINT to be created, propagated, and maintained across the broadcast tree spanned by the group in question, relinquish messages explicitly tear down a mint binding on behalf of its origin.

query messages allow the MINT data store to be queried for name and value information.

These messages are exchanged with peer MINT-PMs and have the following abstract form:

| | |
|---|---|
| publish(G, name, value, pri) | Publish a named value into the network on the MINT channel for group G. The data value will be reliably delivered to all nodes in the network that span the multicast routing tree for G, which will each be able to access to the value by name with the query call. The pri parameter is a small integer that represents the delivery priority of this item compared to other published values (higher priority values tend to be sent before lower priority values). This binding is maintained until the origin terminates or relinquishes the binding with a relinquish command. A value may not be successfully published when the amount of state exceeds the supportable limit. In this case, an error is delivered asynchronously some time after the publishing call is made. |
| relinquish(G, name) | Relinquish the named value that was previously published into the network on the MINT channel for group G. |
| query_names(G) | Return all known names (and respective origins) of data bindings that have been published into the network for group G. |
| query(G, origin. name) | Query the value of the MINT that has been published into the network for group G, whose key is name and origin is origin. Returns the value. |

The Publish Message

The reliability of the present invention is based on a novel delivery mechanism tied to the group membership protocol. Since the MINT protocol is run on a per-group basis, we will refer to the group in question generically as "group G." A peer from which a MINT-PM receives published mints will generally be the on the reverse-path shortest route back to the rendezvous point. This may not always be the case, as the path is dependent on the underlying routing processes. This peer can be referred to as the "parent" peer. At any point in time, published mints may be received from different parents, as a result of the routing changes that may occur with changes in the spanning tree for group G. All of these mints are maintained in the data store associated with the MINT-PM.

MINT-PMs associated with peers in a group, such as group G, communicate mints with each other over the MINT channel in a unicast fashion. The MINT channel is a reliable connection, for example, a reliable TCP connection, that is congruent with the underlying router's peering relationships.

When a MINT-PM receives a new mint from a MINT-PM associated with its parent peer, it enters the mint into its data store and forwards a copy of the mint to MINT-PMs associated with other peers on the current multicast spanning tree for G. For example, a MINT-PM receives a published mint from its parent peer, it updates its data store and then publishes the mint as a parent to other MINT-PMs. Note that this action is carried out atomically against any changes to the spanning tree. The goal is to maintain the invariant that all MINT-PMs associated with peers on the spanning tree for group G, reliably distribute all mints stored in the data store of their respective parent, wherein the ultimate parent is the MINT-PM associated with the rendezvous point for the group.

If the MINT-PM receives a mint (from its parent) that is already in its table, it checks to see if the data value is different. If not, it increments an error counter (accessible via a network management protocol), because the peer should have known not to send a redundant update. If the value is different, the MINT-PM updates its data store and propagates the change (by re-publishing the mint as a parent peer) to each of its child peers on the current multicast spanning tree for G. In effect, the MINT-PM issues another publish command to peer MINT-PMs, as if it were the parent.

If the MINT-PM receives a mint from a peer that is not its parent for group G, then it records the mint update in a shadow table for that peer. If that peer later becomes its parent for G, then this shadow table becomes the actual data store (and any differences encountered while changing tables are treated as normal mint arrivals, changes, or deletions).

If a group G node receives a graft message, and the requesting node is grafted to the group G, all mints associated with group G are sent to the MINT-PM associated with the requesting node. The mints are sent in static priority order (according to the priority field in the tuple). The collection of all known mints must be formed atomically against later mint arrivals and other state changes. If the node receives a prune message from another node in group G, then it need not do anything and must assume that the downstream peer has forgotten all the mints for group G.

If a MINT-PM receives a mint from a peer that is not on the multicast spanning tree for group G, it ignores the update and increments an error counter. This is an error condition, since a peer cannot send mints for group G unless it had previously joined the group.

The Relinquish Message

When a mint for group G is deleted by an origin node (via the relinquish message sent to the rendezvous point), the MINT-PM at the rendezvous point removes the corresponding mint from its data store and propagates a relinquish message to each of its child peers on the current multicast spanning tree for G.

When the MINT-PM receives a relinquish message for a mint from a parent peer, it consults its data store (indexed by owner and name). If a tuple with the same owner and name exists, it removes the corresponding mint from its data store and propagates a relinquish message to each of its child peers on the current multicast spanning tree for G. If no mint with that name and owner exists, an error counter is incremented to indicate the error condition. If a relinquish message is received from a non-parent peer, a shadow table is updated and will be used if that non-parent peer becomes a parent. Any events associated with the relinquishment of a mint are dispatched when the mint is deleted from the data store.

Transaction Examples

The following description will present transaction examples using the MINT protocol in accordance with the present invention. The transaction examples assume that network groups may be formed by routing protocols that use a rendezvous point (RP) to serve as an anchor for the group. During typical network operation, each routing node can directly or indirectly access a specific group and its associated RP.

Figure 5:
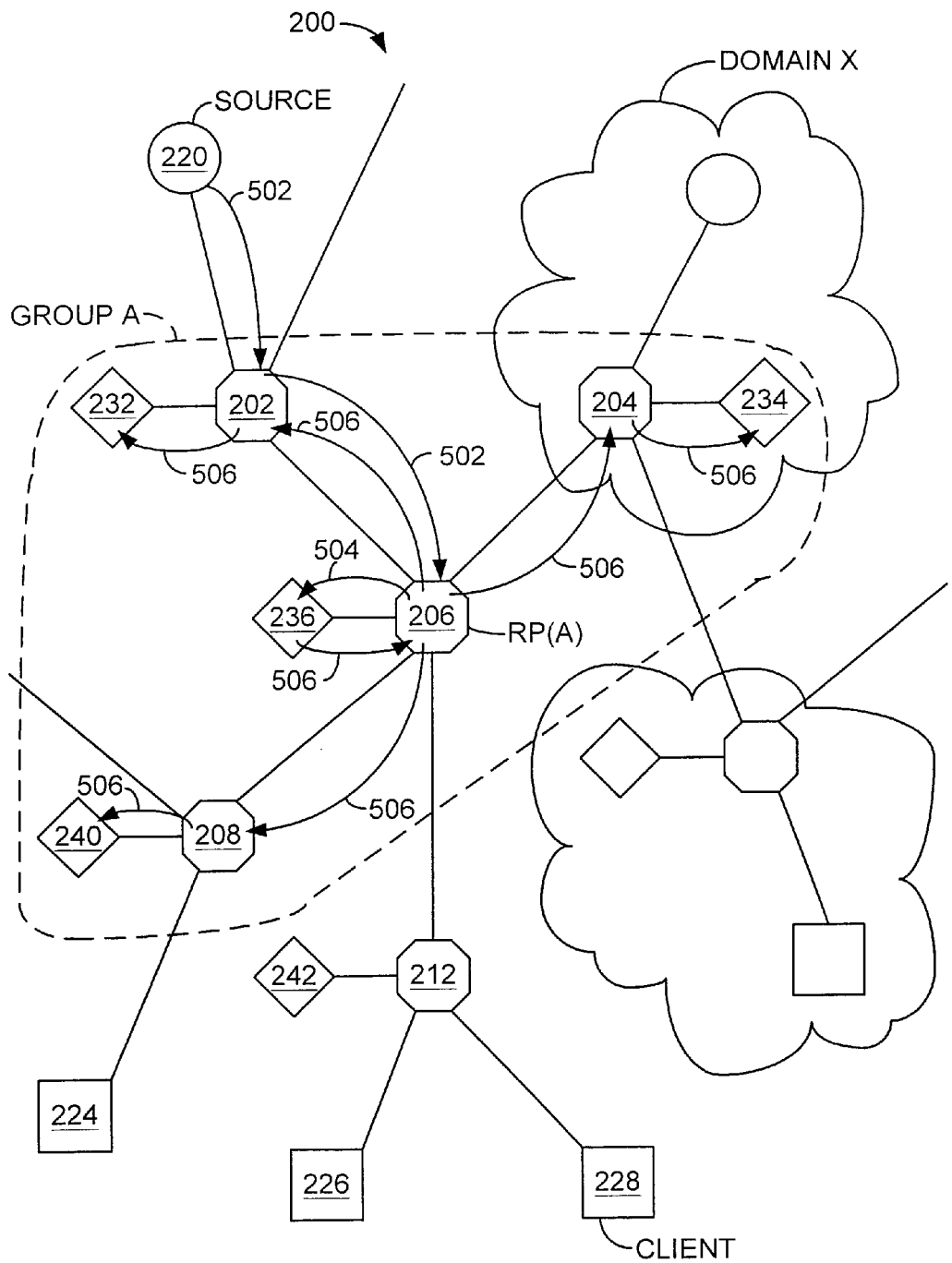
FIG. 5 shows a multicast group defined in the data network of FIG. 2.

FIG. 5 shows the data network 200 and associated MINT processing agents in accordance with the present invention. In the network 200, a multicast group A is formed that has routing node 206 as the RP for the group. The group A includes routing nodes 202, 206, 208 and 204, which route information to other group A members located downstream from these nodes. Note that the present invention is suitable for use with groups formed in a single domain or with groups formed from nodes in multiple domains, as shown by the inclusion of node 204 of domain X in group A.

Figure 6:
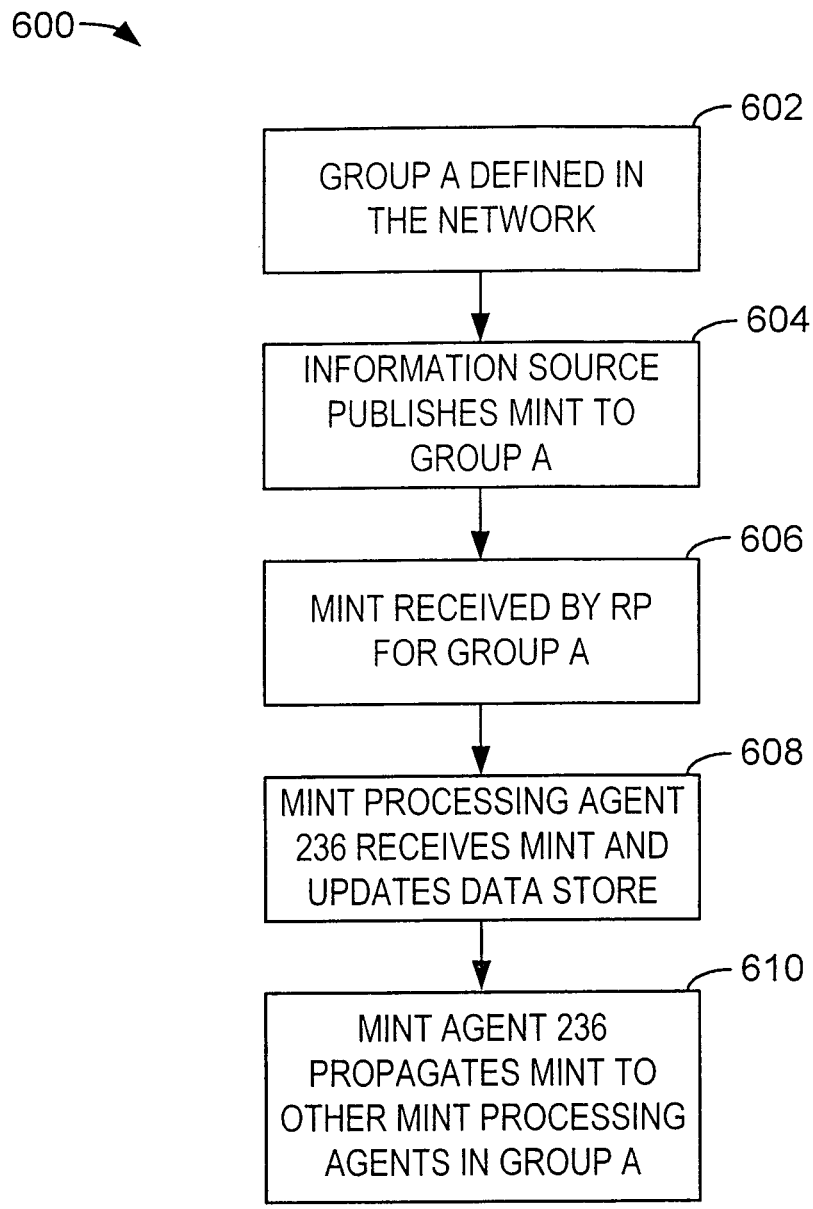
FIG. 6 shows a block diagram for a method of propagating MINT information over the network shown in FIG. 5.

FIG. 6 shows a block diagram for a method 600 of operating the network 200 of FIG. 5 in accordance with the present invention. At block 602, the method 600 begins with the formation of group A having the RP for group A located at node 206 as shown in FIG. 5.

At block 604, the information source 220 publishes a mint to group A. For example, in one embodiment, information source 220 transmits a publish command to group A (which includes mint information), to node 202. As part of the underlying routing protocol, node 202 is aware that node 206 is the RP for the group A. As a result, node 202 routes the publish instruction toward the RP where it is eventually received. In another embodiment, the information source 220 can another embodiment, the information source 220 can query the network, using a directory At block 606, the RP receives the publish command where it is forwarded to the MINT processing agent 236 as shown by transaction path 504.

At block 608, the MINT processing agent 236 updates its data store with the new mint information. This operation occurs when the MINT-PM 302 receives the published mint over the MINT channel 308 and uses the mint information to update its associated data store 304.

At block 610, the updated mint information is propagated to other MINT processing agents in group A, namely, agents 232, 234 and 240. To accomplish this, the MINT-PM associated with the RP distributes the new mint information to the other MINT processing agents in the group A via the MINT channel. The MINT processing agent 236 publishes the new MINT information to group A and the update follows the group A routing as determined by the underlying routing protocol. For example, transaction path 506 shows the routing of the newly published mint information from the MINT processing agent 236 to the other MINT processing agents in group A. Consistency is maintained by following the mint distribution rules as set forth above. As a result, the mint information published by information source 220 is reliably distributed to all the MINT processing agents in group A.

Figure 7:
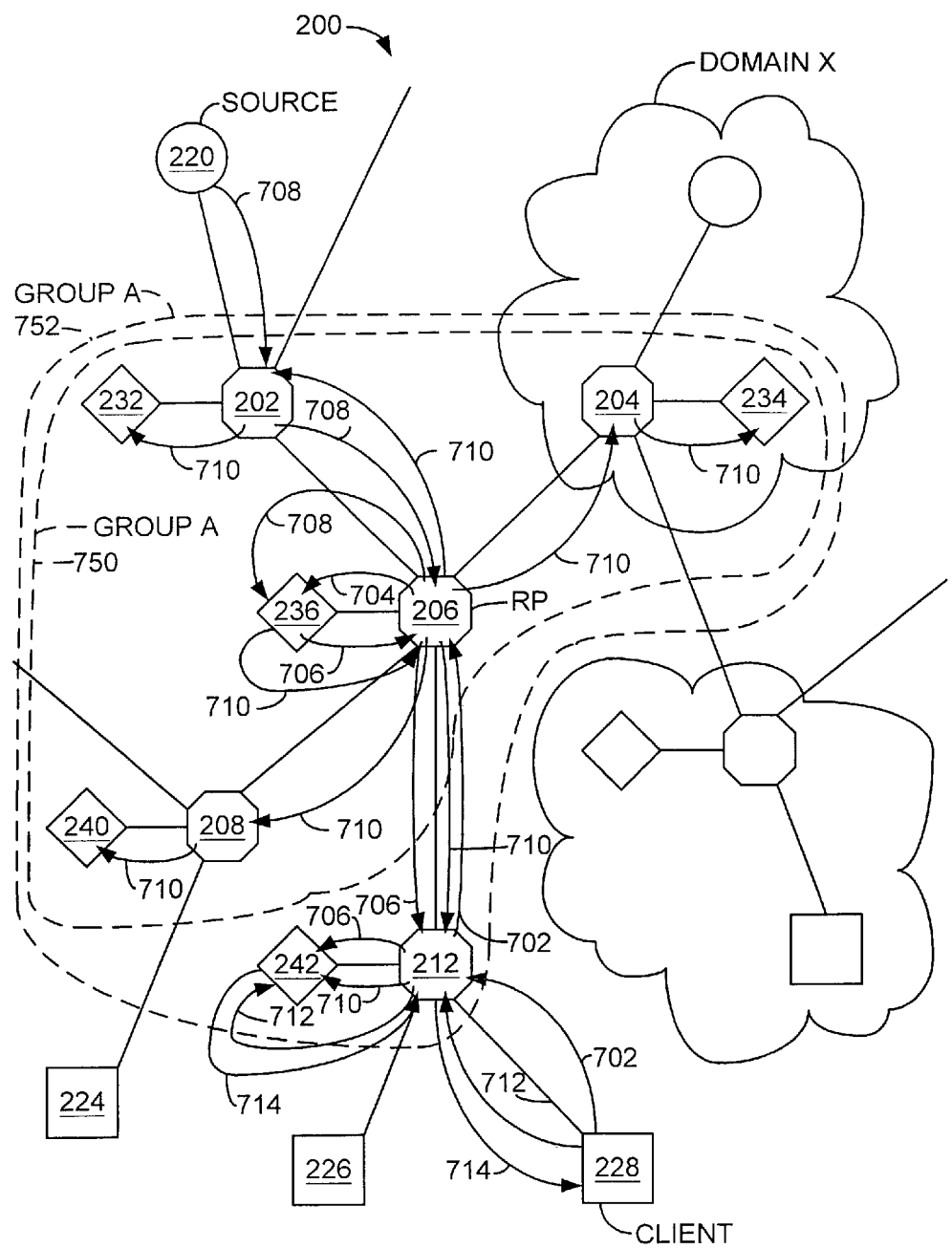
FIG. 7 shows a modified multicast group modified to include a joining node.

FIG. 7 shows the network 200 of FIG. 5 wherein changes to the membership of group A are shown. Note, for example, that the membership for group A is increased from the group designated by line 750, to the group designated by line 752, which includes node 212.

Figure 8:
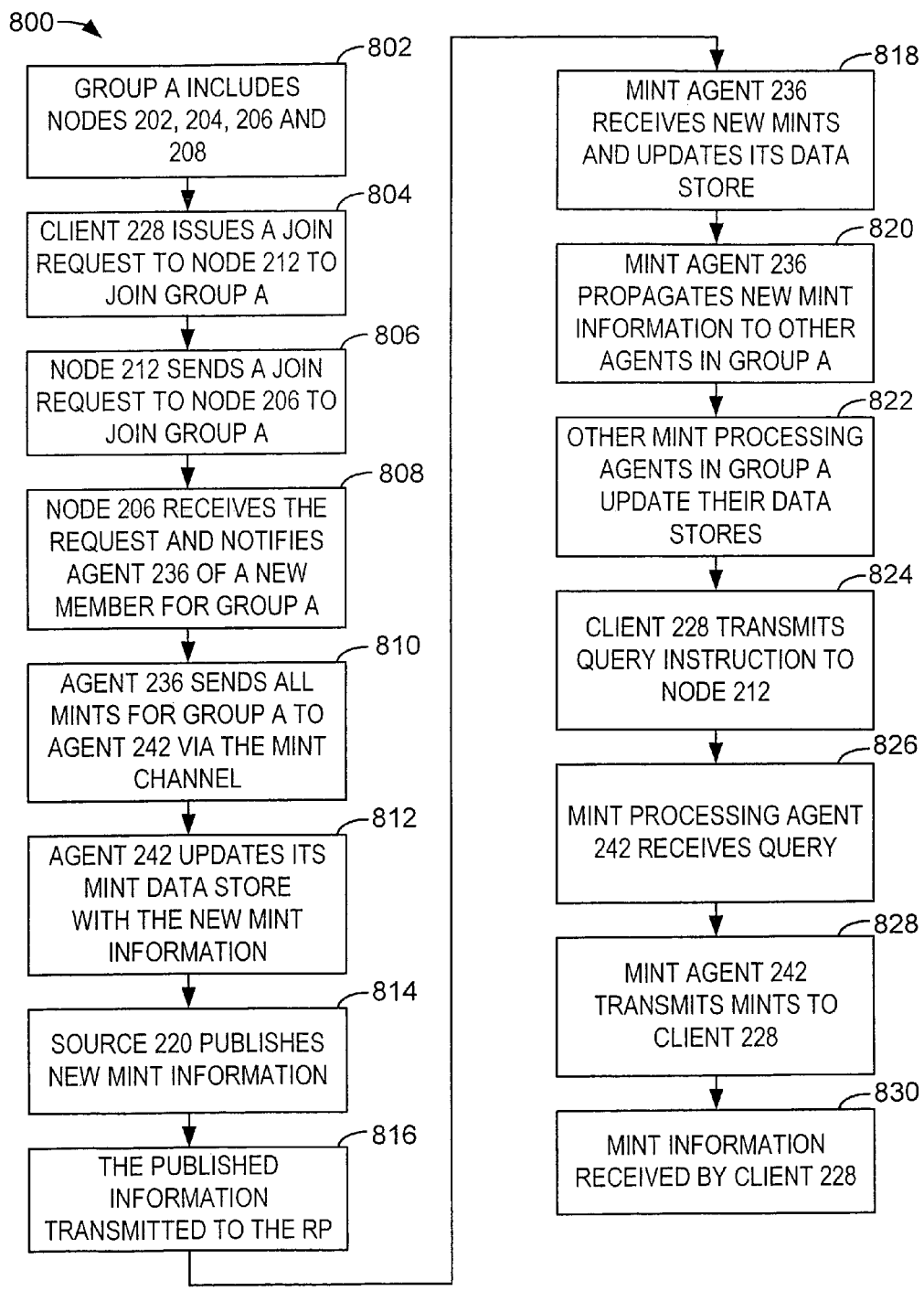
FIG. 8 shows a block diagram for a method of propagating MINT information over the modified multicast group of FIG. 7.

FIG. 8 shows a block diagram for a method 800 of operating the network of FIG. 7 in accordance with the present invention. In the method 800, the client 226 requests to join the group A, and as a result, the group A is expanded to include node 212 and MINT processing agent 242. The method 800 describes how mint information is reliably propagated to accommodate the new group member.

At block 802, the current membership of group A includes nodes 202, 204, 206 and 208 as shown at 750 in FIG. 7. At block 804, the client 228 transmits a request to node 212 to join group A. The client 228 may wish to receive information currently being multicasted over group A. At block 806, the node 212 forwards the join request to node 206, which is already a member of group A. The join request is shown by transaction path 702. When node 212 receives the join request from node 212, node 212 will be included in the spanning tree for group A, so that the group A membership is shown by 752. The MINT processing agent 242 which is associated with node 212 also becomes a member of group A.

At block 808, node 206 notifies the MINT processing agent 236 that node 212, and its associated MINT processing agent 242, have joined group A. This is shown by transaction path 704. At block 810, the MINT processing agent 236 propagates mints relating to group A from its MINT data store to newly added MINT processing agent 242. The mints are propagated over the MINT channel when the MINT-PM of agent 236 publishes mint information to the MINT-PM of agent 242. This is shown by transaction path 706. At block 812, the MINT processing agent 242 updates its data store with the new MINT information so that all of the MINT processing agents in group A have identical group A MINT information. Note that MINT agent 236 is the parent peer of MINT agent 242. If the MINT processing agent 242 was a parent peer to other newly attached MINT processing agents, it would re-publish the new mint information to those other MINT processing agents.

In the above example, only one node is added to the group A, which was then subsequently updated with mint information. In a situation where several nodes are added to the group, the mint propagation may follow the route established as a result of the join request. For example, in one embodiment, the mint information propagates in the reverse direction (compared to the join request); hop by hop starting from the node in the group that received the join request back to the join requestor. Each MINT processing agent in the reverse hop by hop route is updated until all the MINT processing agents associated with the new branch of the spanning tree for the group are updated.

With all MINT processing agents having the identical mint information relating to group A in their respective data stores, the source 220 desires to publish updated mint information to group A. At block 814, the source 220 transmits a publish command to the RP via node 202. This is shown by transaction path 708. As before, the source may use one of several ways to transmit the publish command to the RP for group A.

At block 816, the RP receives the publish command from the source 220. At block 818, the RP notifies the MINT processing agent 236 of the publish command (path 708) and the MINT processing agent 236 receives the mints and updates its data store based on the mints in the new publish command. At block 820, the MINT processing agent 236 propagates (as parent) the new mint information to all peer MINT processing agents (child peers) associated with the group A. One way this can occur is when the MINT processing agent 236 issues a publish command over the MINT channel to other members of group A, as shown by transaction path 710. As a result, the new mint information is reliably propagated to the nodes 202, 204, 208 and 212, which are all part of group A and child peers to agent 236.

In this example, the new mint information published by agent 236 only need propagate one hop to reach the child peers as shown in FIG. 7. However, it will be apparent to those with skill in the art that the child peers can re-publish the mint information (as parents) to other nodes in group A. Thus, if the group A spanning tree includes large branches of interconnected nodes, the new mint information would propagate hop by hop (from parent to child) down the spanning tree to all nodes (and MINT processing agents) associated with group A.

At block 822, the MINT processing agents 232, 234, 240 and 242 all receive the new mint information and update their associated data stores with the new mint information. Thus, in accordance with the present invention, the newly published mint information is reliably distributed to all MINT processing agents associated with active nodes in the spanning tree of group A.

The method 800 also illustrates how the mint information can be queried in accordance with the present invention.

At block 824, client 228 wishes to query mint information associated with group A. The client 228 transmits a query instruction to node 212 that specifies group A as the group of interest. The type of query used will return all known names (and respective origins) of data bindings that have been published into the network for group A. For example, the name based query instruction [query_name(A)] above will return this information.

At block 826, the MINT processing agent 242 receives the query instruction. This is shown by transaction path 712.

At block 828, the MINT processing agent 242 responds with the requested mint information by transmitting the result of the query to the client 228 as shown by transaction path 714. This occurs when the MINT-PM at agent 242 retrieve the requested information from its associated mint data store and transmits the result over the MINT channel to the client 228. At block 830, the client 228 receives the requested mint information, and as a result, the client 228 can use the returned mint information to determine group A status or take action to receive a data stream transmitted in group A.

Figure 9:
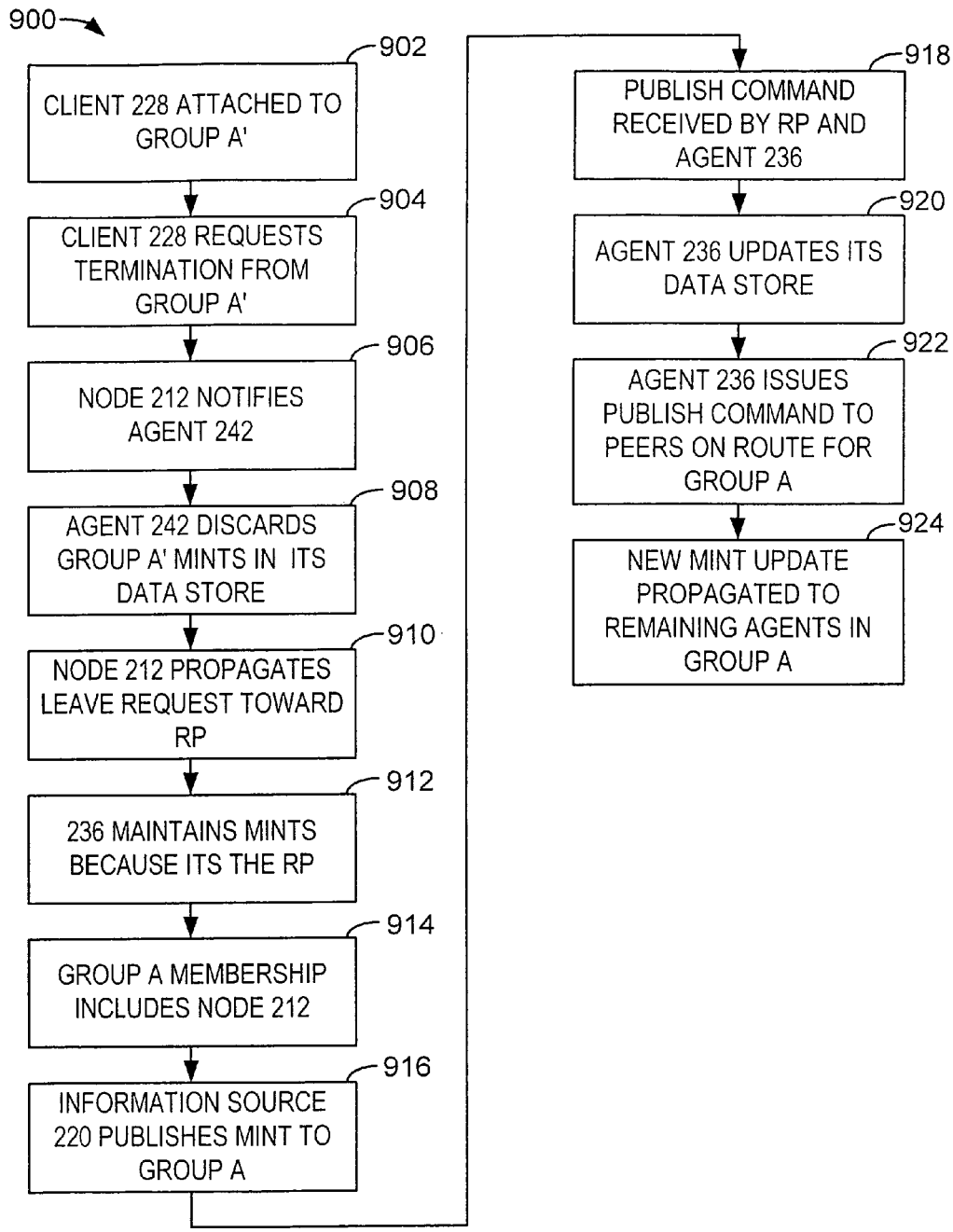
FIG. 9 shows a block diagram of a method of releasing a node in a multicast group and terminating its associated MINT binding.

FIG. 9 shows a block diagram for a method 900 wherein the client 228 terminates its connection to the group A and relinquishes its MINT binding. The method 900 will be discussed with reference to FIG. 10 and FIG. 11.

Figure 10:
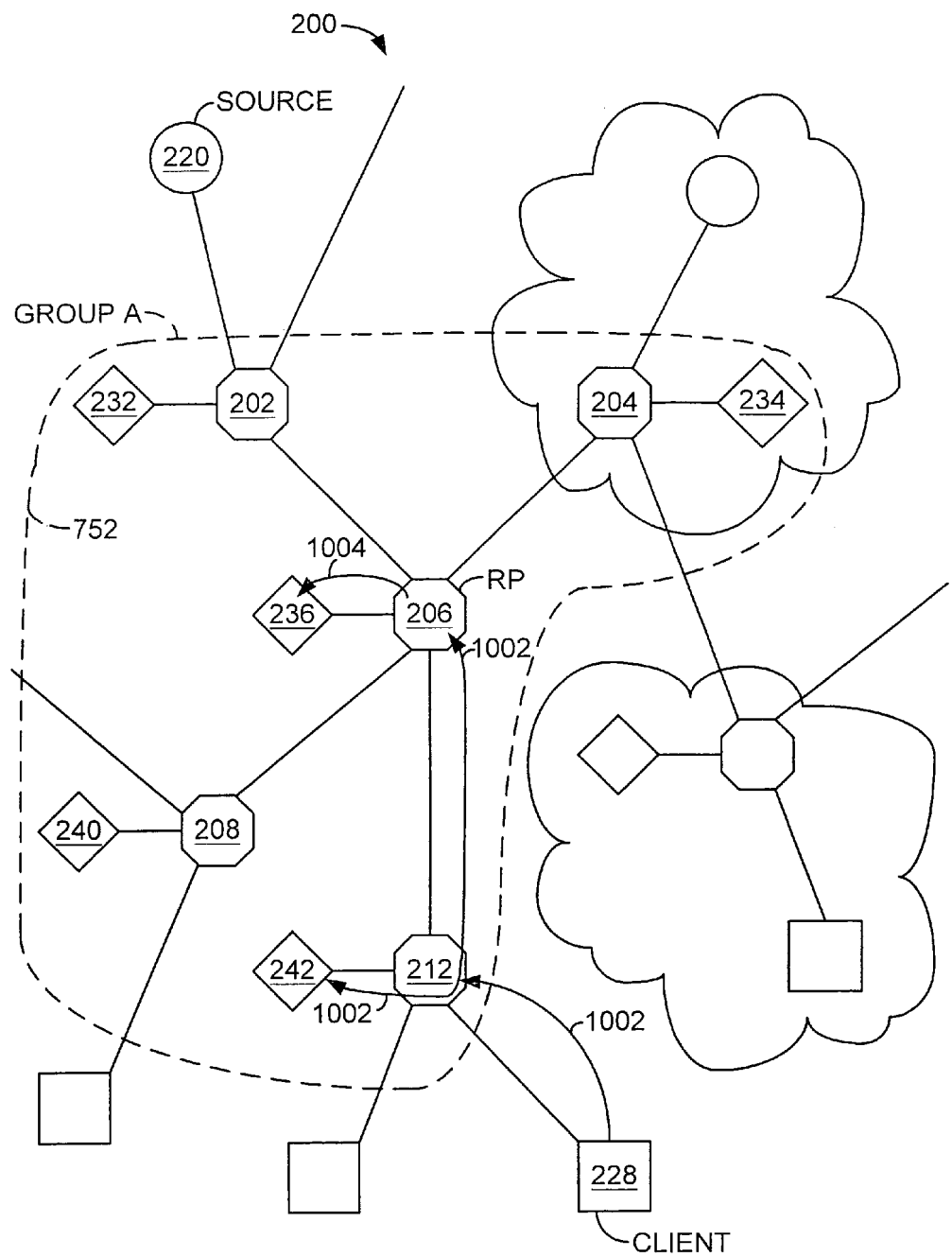
FIG. 10 is a diagram further illustrating transaction steps during the operation of the method shown in FIG. 9.
Figure 11:
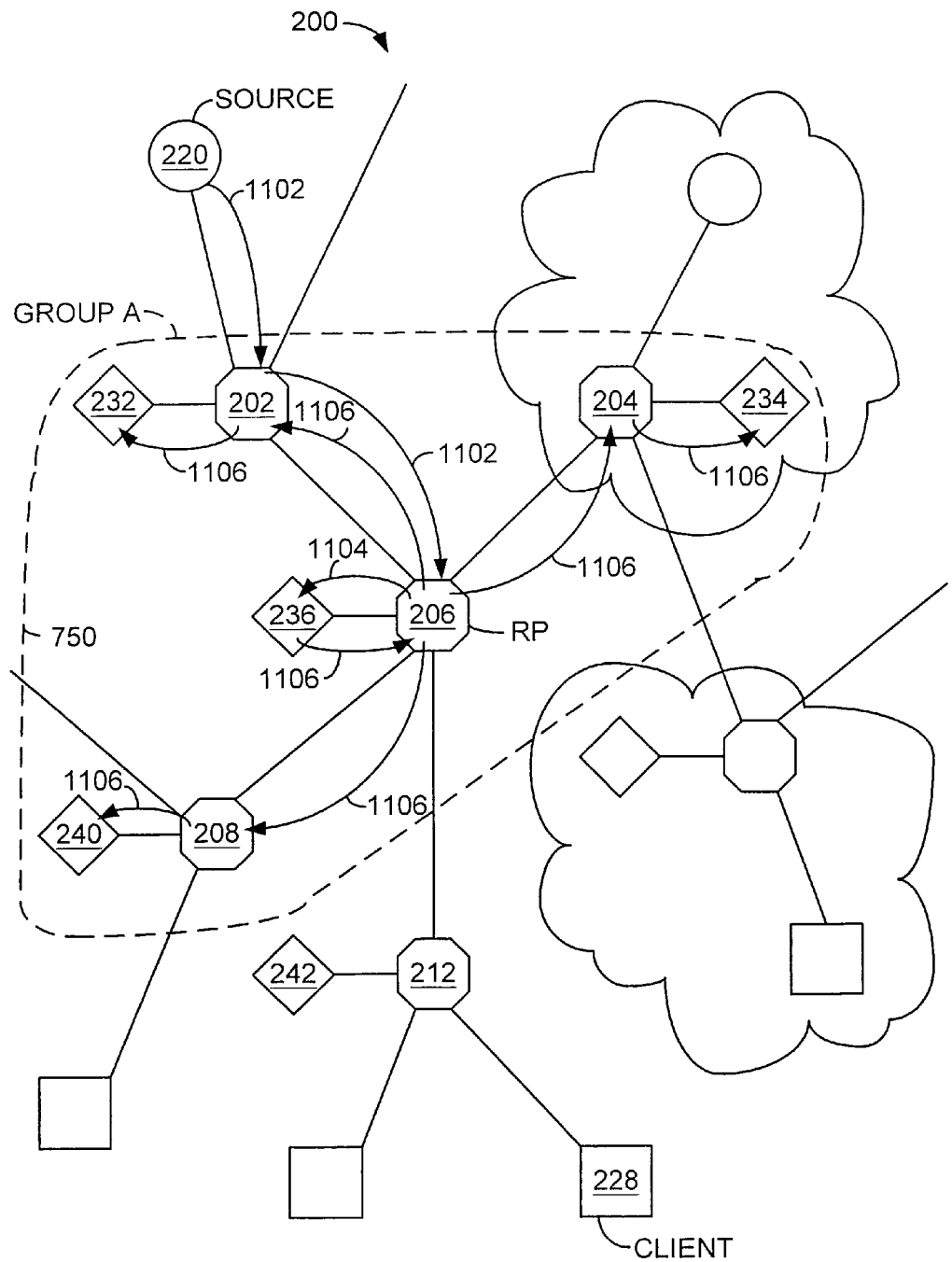
FIG. 11 is a diagram further illustrating transaction steps during the operation of the method shown in FIG. 9.

FIGS. 10 and 11 show the network 200 and associated transactions that occur during the operation of the method 900.

Referring again to FIG. 9, at block 902, client 228 is attached to the group A, which consists of nodes and MINT processing agents as shown in FIG. 10. At block 904, the client 228 requests termination from group A by transmitting a leave request from client 228 to node 212. The route of the leave request is shown at 1002.

At block 906, the node 212 notifies agent 242 that client 228 is terminating its membership from group A, and thus node 212 will be pruned from the group. At block 908, since node 212 is to be pruned from the group A, agent 242 discards mints relating to group A. Note, however, that if node 212 is a member of other groups, mints relating to those other groups will be maintained by agent 242. In other embodiments, agent 242 may maintain mints after leaving the group in accordance with another aspect of the invention as describe in a section below.

At block 910, the node 212 propagates the leave request toward the RP (node 206) where it will eventually be received. The RP notifies agent 236 of the leave request (by client 228) as shown at transaction path 1004. At block 912, the agent 236 maintains it store of mints for the group A since it is associated with the RP for the group. As long as group A exists, the agent 236 will maintain its data store of mints, in case it is required to propagate them to other group members.

At block 914, the RP (node 206) processes the leave request from client 228, and as a result, the node 212 is pruned from the group A. After this occurs, the resulting group comprises nodes 202, 206 and 208 as shown by the group A of FIG. 11.

Referring now to FIG. 11, with node 212 pruned from the group, the method 900 continues with additional transactions which are described as follows.

At block 916, the information source 220 publishes a new mint relating to the group A. The node 202 receives the publish command and routes it toward the RP. As discussed above, the information source may find the location of the RP and issue the publish command directly to the RP. Alternatively, the node 202 may know the location of the RP, as a result of the underlying group routing protocol, and therefore, route the publish command toward the RP. This transaction is shown at transaction path 1102.

At block 918, the RP receives the publish command and forwards the published mints to the MINT processing agent 236, as shown at transaction path 1104. At block 920, the MINT processing agent 236 updates its data store with the new mint information. At block 922, the MINT processing agent propagates the new mint information to the other MINT processing agents in the group A, namely, agents 232, 234 and 240. This is shown by transaction paths 1106. The mint propagation occurs when the agent 236 issues a publish command with the new mint information to other nodes in the group A.

As a result of the client 228 terminating its attachment to the group A, and consequently node 212 being pruned from the group A spanning tree, the MINT processing agent 242 will no longer be updated with new mint information for group A. However, the MINT protocol will continue to reliably update the mint data stores for MINT processing agents that are active members of the group A. Should node 212 request to join the group A in the future, the updated mints would again be propagated to node 212 and thereafter to MINT processing agent 242.

In another embodiment, the MINT protocol operates to overcome problems associated with excessive routing fluctuations. During excessive routing fluctuations, where particular nodes repeatedly leave and then re-join the group, the mint information in the data stores associated with those nodes is repeatedly discarded and repopulated. This results in excessive transmission of mint information on the data network. To avoid this problem, enhancements to the MINT protocol avoid discarding and repopulating the data stores as a result of excessive routing changes.

In one embodiment, a MINT digest is computed over the mints in the data store. The MINT digest may represent all mints in the data store or selected portions of the mints in the data store. Instead of discarding the mint information when a node leaves the group, the mint information associated with that node is preserved in the data store along with its associated MINT digest. When that node rejoins the group, it transmits its MINT digest to the group. If the MINT digest at the node is different from the current MINT digest for the group, then the node is updated with a new copy of the mint information. The node then updates its mint data store and its associated digest. If the MINT digest from the node matches the MINT digest for the group, then it is not necessary to transmit a new copy of the mint information to the node. Therefore, the enhanced MINT protocol averts the excessive transmission of mint information in the network.

In another embodiment, a time parameter is used to prevent the resources of the data stores from being utilized to store outdated mint information. When a node leaves a group, the MINT processing agent associated with that node uses the time parameter to determine how long to preserve the mint information in the data store. The time parameter value can be determined by a network administrator. By preserving the data store and its associated MINT digest during the time period defined by the time parameter, excessive transmission of mint information can be prevented as discussed above. However, once a node leaves a group and the expiration of a time period defined by the time parameter occurs, the mint data store can be purged of mints for that group, thereby freeing up resources of the data store. Therefore, the MINT processing agent preserves the data store to prevent redundant mint transmissions during network flapping, and after expiration of a selected time period, purges the data store to free up valuable resources to store additional mints.

As will be apparent to those of skill in the art, variations in the above described methods and apparatus for implementing the MINT protocol are possible without deviating from the scope of the present invention. Accordingly, the disclosures and descriptions herein are intended to be illustrative, but not limiting, of the scope of the invention which is set forth in the following claims.

What is claimed is:

1. An apparatus for processing data at a node in a data network, wherein the data network connects a plurality of nodes and at least a portion of the plurality of the nodes form a multicast group, the apparatus comprising:
   a non-transitory computer-readable data store that stores, in a database, a plurality of entries associated with the multicast group, wherein each entry comprises data to be transmitted from a rendezvous node of the multicast group to members of the multicast group; and
   one or more hardware processors;
   one or more sequences of instructions which, when executed by the one or more hardware processors, cause the one or more hardware processors to execute:
      logic that disseminates the plurality of entries to members of the multicast group;
      logic that receives, from a node that is not a member of the multicast group, a request to run a query against the entries stored in the data store, wherein the query specifies matching criteria;
      logic that runs the query against the entries in the data store;
      logic that indicates that the apparatus has been designated as the rendezvous node in the multicast group, wherein designation as the rendezvous node indicates that the apparatus is to disseminate the plurality of entries to members of the multicast group; and
      logic that disseminates one or more entries that satisfy the matching criteria to the node that is not a member of the multicast group.

2. The apparatus of claim 1, further comprising logic that adds a first entry to the plurality of entries in the data store in response to a request from a first node to add the first entry.

3. The apparatus of claim 2, wherein the logic that adds a first entry to the plurality of entries further automatically disseminates the first entry to the plurality of the nodes that form the multicast group in response to the request from the first node to add the first entry to the plurality of entries.

4. The apparatus of claim 1, further comprising logic that deletes a first entry of the plurality of entries in the data store in response to a request from a first node to relinquish the first entry.

5. The apparatus of claim 4, further comprising logic that indicates, to the plurality of the nodes that form the multicast group, that the first entry has been relinquished, wherein the indication is in response to the request from the first node to relinquish the first entry.

6. The apparatus of claim 1, wherein a source that published the entry is not a member of the multicast group.

7. The apparatus of claim 1, wherein a source that published the entry is a member of the multicast group.

8. The apparatus of claim 1, wherein each entry is associated with a priority that specifies its delivery priority relative to other entries.

9. The apparatus of claim 1, wherein the plurality of entries to members of the multicast group comprises updates to data stores associated with nodes that are not members of the multicast group.

10. A method for operating an apparatus coupled to a selected node in a data network, wherein the data network connects a plurality of nodes and at least a portion of the plurality of the nodes, including the selected node, form a multicast group, the method comprising steps of:
   storing, in a database, of a data store, at the apparatus, a plurality of entries associated with the multicast group, wherein each entry comprises data to be transmitted from a rendezvous node of the multicast group to members of the multicast group;
   disseminating the plurality of entries to members of the multicast group;
   receiving a request from a node that is not member of the multicast group to run a query against the entries stored in the data store, wherein the query specifies matching criteria;
   indicating that the apparatus has been designated as the rendezvous node in the multicast group, wherein designation as the rendezvous node indicates that the apparatus is to disseminate the plurality of entries to members of the multicast group; and
   disseminating one or more entries that satisfy the matching criteria to the node that is not member of the multicast group.

11. The method of claim 10, further comprising adding a first entry to the plurality of entries stored at the apparatus in response to a request from a first node to add the first entry.

12. The method of claim 11, further comprising automatically disseminating the first entry to the plurality of the nodes that form the multicast group in response to the request from the first node to add the first entry.

13. The method of claim 10, further comprising deleting a first entry of the plurality of entries stored at the apparatus in response to a request from a first node to relinquish the first entry.

14. The method of claim 13, further comprising indicating to the plurality of the nodes that form the multicast group that the first entry of the plurality of entries stored at the apparatus has been relinquished, wherein the indicating is performed in response to the request from the first node to relinquish the first entry.

15. The method of claim 10, wherein a source that published the entry is not a member of the multicast group.

16. The method of claim 10, wherein a source that published the entry is a member of the multicast group.

17. The method of claim 10, wherein each entry is associated with a priority that specifies its delivery priority relative to other entries.

18. The method of claim 10, further comprising:
receiving, from a particular node, a request to run a query against the entries stored at the apparatus, wherein the query specifies a source that published one or more entries; and
asynchronously notifying the particular node of a modification to a first entry;
wherein the asynchronously notifying the particular node is performed in response to the source that published the first entry modifying the first entry.

19. The method of claim 10, wherein the plurality of entries to members of the multicast group comprises updates to data stores associated with nodes that are not members of the multicast group.

20. A data network for transmitting data, wherein the data network connects a plurality of nodes and at least a portion of the plurality of the nodes form a multicast group, the data network comprising:
a plurality of apparatuses, each of the apparatuses comprising:
a non-transitory computer-readable data store that stores, in a database, a plurality of entries associated with the multicast group, wherein each entry comprises data to be transmitted from a rendezvous node of the multicast group to members of the multicast group; and
one or more hardware processors;
one or more sequences of instructions which when executed by the one or more hardware processors, cause the one or more hardware processors to execute:
logic that disseminates the plurality of entries to members of the multicast group;
logic that receives, from a node that is not a member of the multicast group, a request to run a query against the entries stored in the data store, wherein the query specifies matching criteria;
logic that runs the query against the entries in the data store;
logic that indicates that the apparatus has been designated as the rendezvous node in the multicast group, wherein designation as the rendezvous node indicates that the apparatus is to disseminate the plurality of entries to members of the multicast group; and
logic that disseminates one or more entries that satisfy the matching criteria to the node that is not a member of the multicast group.

21. The data network of claim 20, wherein the plurality of entries to members of the multicast group comprises updates to data stores associated with nodes that are not members of the multicast group.

* * * * *